United States Patent [19]

Kroczynski

[11] Patent Number: 4,565,487

[45] Date of Patent: Jan. 21, 1986

[54] SYSTEM OF ROBOTS WITH LEGS OR ARMS

[75] Inventor: Patrice Kroczynski, Vitry sur Seine, France

[73] Assignee: International Robotic Engineering, Inc., New York, N.Y.

[21] Appl. No.: 413,791

[22] Filed: Sep. 1, 1982

[30] Foreign Application Priority Data

Sep. 4, 1981 [FR] France ................. 81 16970

[51] Int. Cl.⁴ ............................................. B25T 9/00
[52] U.S. Cl. .................... 414/730; 180/8.6;
280/1.22; 901/1; 901/15; 901/22; 901/28;
D21/134; D21/135
[58] Field of Search ........................ 414/1, 4, 730, 735;
901/1, 22, 23, 28, 15; 280/1.22; 180/8.1, 8.5,
8.6; 46/264, 265, 266, 124, 123, 92; D12/320;
D21/185, 134, 148; 114/249

[56] References Cited

U.S. PATENT DOCUMENTS

| D. 266,777 | 11/1982 | Lucas, Jr. et al. ................. D21/134 |
| 3,550,386 | 12/1970 | Ballinger ......................... 414/732 X |
| 4,202,423 | 5/1980 | Soto ..................................... 180/8.6 |
| 4,348,731 | 9/1982 | Kogawa ......................... 414/730 X |

FOREIGN PATENT DOCUMENTS 2307118  11/1972  Fed. Rep. of Germany ........ 46/124
422580   9/1974   U.S.S.R. ............................... 901/22

OTHER PUBLICATIONS

Discover the Tomorrow Tool-Today, Cincinnati Milacron, 1977.

Primary Examiner—Robert J. Spar
Assistant Examiner—Donald W. Underwood
Attorney, Agent, or Firm—James & Franklin

[57] ABSTRACT

A robot system is disclosed comprising a robot having a plurality of articulated members, actuator jacks for effecting movements (locomotion or other operations) of the articulated members, and a data processing unit controlling the jack actuators. One articulated member is pivotally mounted about three separate axes intersecting at a first fixed point. Two jack actuators are provided for the one articulated member. Two ball joints articulate the jack actuators to the one articulated member about two points separate from and out of alignment with the first fixed point and two other ball joints articulate the jack actuators about respective second and third points also separate from and out of alignment with the first fixed point. The one articulated member comprises a perpendicular plate, the two points articulated to the jack actuators being disposed at the plate and the axes of the two jack actuators lying in mutually perpendicular planes.

19 Claims, 29 Drawing Figures

SYSTEM OF ROBOTS WITH LEGS OR ARMS

BACKGROUND OF THE INVENTION

The present invention relates to robots having articulated members, i.e., arms or legs. The most important uses thereof are in the field of human survival subsequent to a natural catastrophe or one caused by man, all-terrain or amphibious vehicles or mobile units, assisting immobilised vehicles or unit, leg supported building structures, recreational robots, amusement park rides or park transportation, display of goods, and assisting machine tools.

One arm or leg and eight arm or leg robots are known having electrical or hydraulic actuators such as legged Soviet war robots. But such robots have limited abilities owing to their kinematics specifically adapted to displacement and automatic firing functions. Furthermore, such robots are not of modular construction and it is not possible for them to increase their power or enhance their flexibility on their own.

SUMMARY OF THE INVENTION

According to the invention there is provided a robot system comprising a robot having a plurality of articulated members such as arm or legs, actuating members for effecting movements of the articulated members, e.g., for locomotion or handling operations, and a data processing unit for controlling the actuating means. The robot system is characterized by one of the articulated members being pivotally mounted about their separate axes intersecting at a first point. The actuating means for one of the articulated members comprises two jack actuators. Two ball joint means articulate the jack actuators to the one articulated member about two points separate from and out of alignment with the first fixed point. Two other ball joint means articulate the two jack actuators about respective second and third fixed points which are separate from and out of alignment with the first fixed point.

The present invention makes it possible to avoid the above drawbacks. In fact, due to combined hardware and softward structure designed around a multiprocessor, robots according to the invention may change their tools or accessories on their own, use six legs for locomotion or four legs for locomotion and use two legs as arms after changing tools or accessories. Synchronized operation of a group of robots to increase available power is also possible.

Preferably, the one articulated member comprises a plate perpendicular to its longitudinal axis, the two points at which the two ball joint means are articulated to the two jack actuators being disposed at said plate, the axes of the two jack actuators lying in mutually perpendicular planes.

According to one embodiment the robot is a self contained module including a power unit, one or two articulated members being provided on the power unit, clamping means for clamping the modules on an associated body or load, and a telecommunications channel for connection with the data processing unit.

According to another embodiment the robot comprises a tubular body equipped with seating and/or display means.

According to another embodiment the robot comprises a head, a body and a collar therebetween, the collar comprising rigid overlapping elements, sealing means between the overlapping elements and a jack actuator for controlling the position of the head relative to the body. Alternatively, fluid-controlled bladders may be provided between such overlapping elements for exerting variable pressure thereon, and a pulley-and-cable means maintains the distance between the head and body.

According to another feature the robot comprises ballast containers for selectively controlling diving in the case of submersible use and equilibrium in or out of water.

According to another embodiment of the invention the robot comprises a shell including tool/accessory chest therein, tool/accessory changing means at the free ends of the articulated members including friction surfaces, and a servo loop for controlling the operation of the tool/accessory changing means.

DESCRIPTION OF THE PREFERRED EMBODIMENTS

Figure 1:
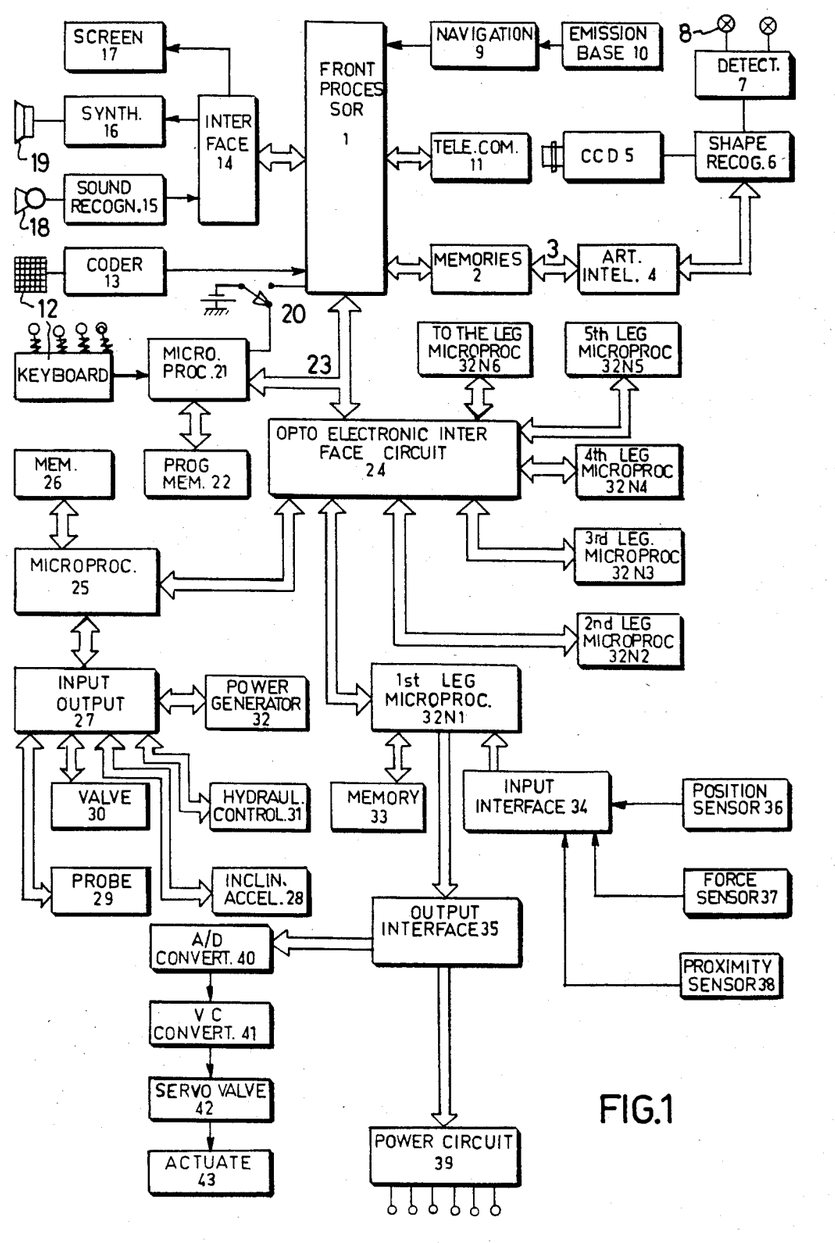
FIG. 1 is a block diagram of a data processing unit of a robot control system.

A data processing unit for a robot according to the present invention comprises a central processor 1 (FIG. 1). Central processor 1 is connected to main memories and electrically reprogrammable memories 2. Memories 2 are connected by a random access memory (RAM) 3 to artificial intelligence circuits 4. Circuits 4 may be TROPIC, IDA, NOAH, MYCIN, DENDRAL type systems with ALICE, PLASMA or another specialized language. Artificial intelligence will be learned by descriptions, procedures or concepts mode.

A CCD camera 5 provides a digital signal which is processed by shape recognition circuits 6. The software thereof will be designed according to the following control classifications: bayesian decision, parametric methods or dichotomizing methods.

An ultrasonic obstacle detector 7 is coupled to its transmitter and receiver probes 8. Of course, instead of detector 7, narrow beam multibond transmitters may be used, so as to enhance obstacle definition. Similarly, an alternative embodiment involves the coupling of a Doppler effect circuit for providing information on the relative speed of obstacles. The digital data from the obstacle detector are fed to the artificial intelligence circuits 4. The central processor 1 is also coupled to navigation circuits 9. Use may be made of various circuits known in the navigation art, especially dead-reckoning by summing the displacements in various directions, automatic goniometric navigation, satellite navigation, hyperbolic navigation with ground or underground beacons (pinger transmitters or transponders).

Such data are supplemented by locating sensors 10 which supply the coordinates of the robots position with respect to two points on the ground, from which the position with respect to the surface (e.g. advance in marshland) may be deduced, in connection with an electrolytic inclinometer or accelerometer.

A conduction type water sensor is installed close to each probe 8, whereby the clock frequency corresponding to the velocity of ultrasonic waves in air and water may be varied. A telecommunications channel 11 is coupled to the central processor 1. The telecommunications channel 11 permits synchronization of groups of robots or, upon request from a robot, the use of infrared or radio waves.

On the other hand, the central processor 1 is connected to a keyboard 12 through a coder 13 whereby programs or commands (e.g. the course heading) may be entered. An interface 14 effects the connection with the sound recognition circuit 15 provided with a microphone 18 for voice control of the robot.

A voice synthetizer 16 operates a loudspeaker 19 for voice communication with the robot. A screen 17 is adapted to display the parameters in the robot cab. Of course, for simple robots, such as walking robots, most of those devices are not necessary for its operation.

A switch 20 affords selection among intelligent walking mode, robotic rescue mode, or servicing mode. In safe conditions; for instance appearance of demons (holes in the softwear generating random output data) in the artificial intelligence mode, a microprocessor 21 is substituted for the central processor 7, but the robot does not then have artificial intelligence and its abilities are reduced, its memory is limited to the main memory 2 and to the program memory 22 of microprocessor 21.

By means of a connector 23 the central processor 1 may be disconnected for repair.

All the actuators and sensors of the robot are connected to the optoelectronic interface circuit 24. The microprocessor 25 for controlling fluids and utilities is connected to its associated memory 26 which comprises an empty memory portion and an electrically programmable memory portion. An input/outut circuit 27 is coupled to the controls of the heat engine or power generator 32 as well as to the ultradonic emergency probe 29 and to the emergency accelerometer or electrolytic inclinometer 28.

In case of submersible robots, the valves 30 of the special ballasts containers are also connected to the input/output circuit 27 as are the pressure sensors and the hydraulic cylinder control 31 for the hydraulic generator unit 31.

The optaelectric interface circuit 24 is also connected to the microprocessors for the articulated members or legs; as illustrated in FIG. 1, six legs microprocessors represented by the blocks designated 32 N1, 32 N2, 32 N3, 32 N4, 32 N5 and 32 N6. But for the sake of simplification, the circuiting for only the leg having microprocessor 32 N1 is shown in detail. It is connected to its respective main memory and electrically programmable memories 33 as well as to the input interface circuit 34 and to the output interface circuit 35.

The position sensors 36 for articulatory variables the force sensors 37 (which are pressure sensors in the case of hydraulic robots) as well as the ultrasonic proximity sensors 38 for ultimate approach of the leg are connected to the input interface 34.

The output interface 35 is connected to a digital analog converter 40 which supplies voltage to the voltage/current converter circuit 41 in turn feeding the servo valve 42 which allows flow, at a proportional rate, to the hydraulic actuator 43 corresponding to an articulatory variable. It should be noted that each articulatory variable is controlled by a similar system, not shown for the sake of simplification.

The output interface 35 is connected to the power circuit 39 which controls the electromagnets for locking accessories or tools on the leg.

Figures 2, 3:
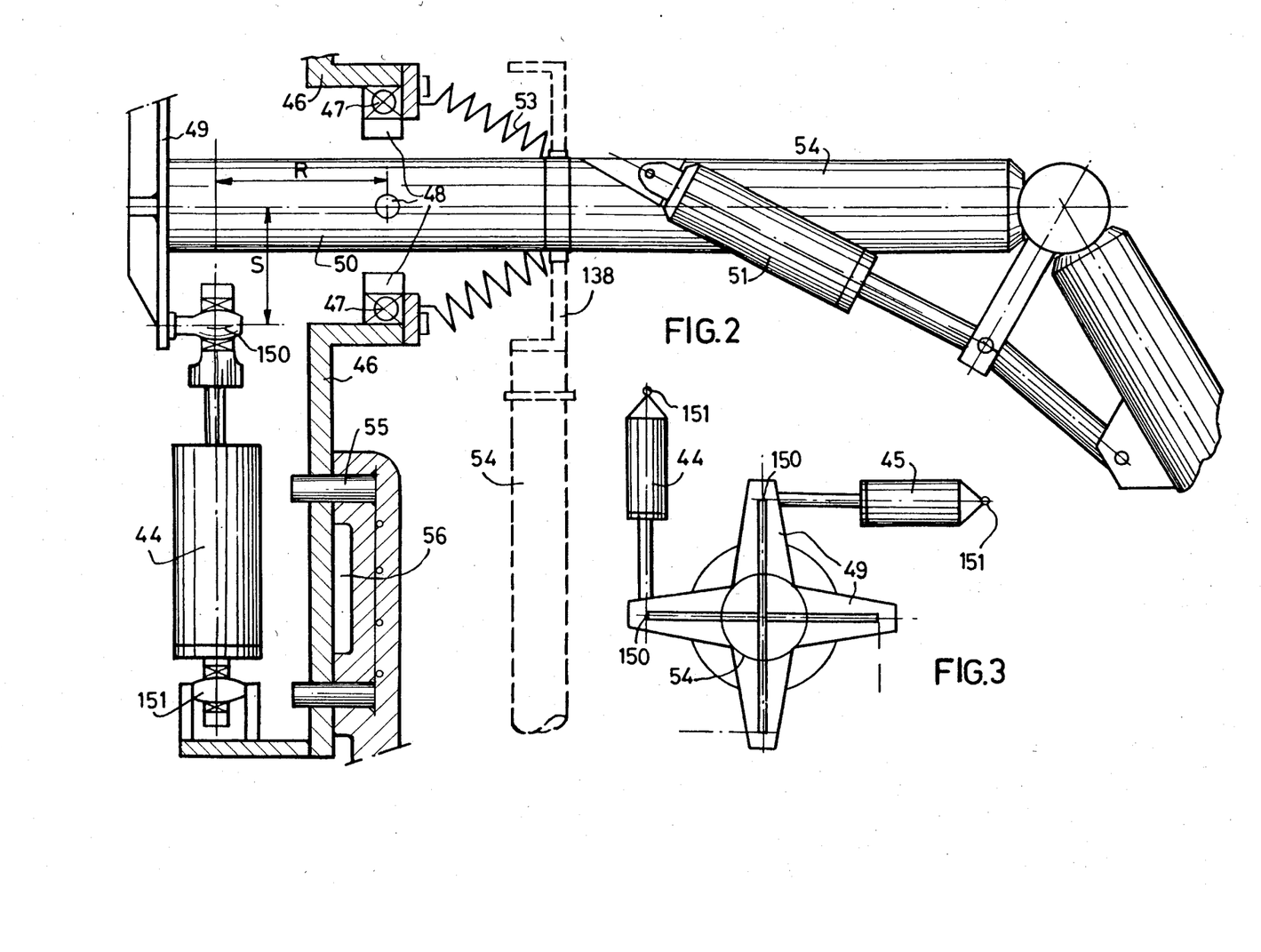
FIG. 2 is an elevational view, partly in section, of a robot's shoulder/hip structure having three degrees of freedom.
FIG. 3 shows, on a reduced scale, an arrangement of actuators for the shoulder/hip structure of FIG. 2.
Figure 2A:
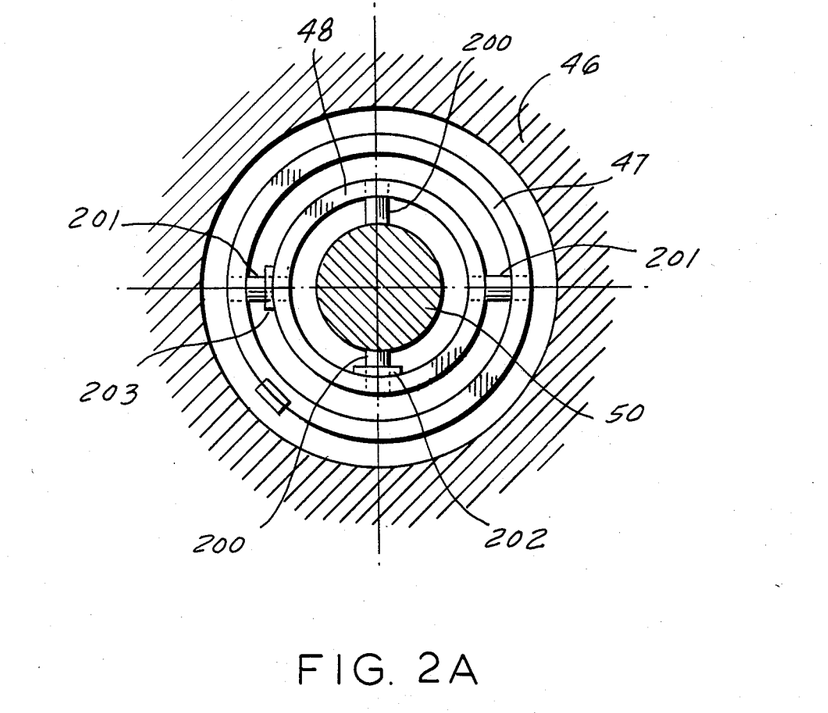
FIG. 2A is a cross-sectional view of the bearing illustrated in FIG. 2.

FIG. 2A is a cross-sectional view of the apparatus illustrated in FIG. 2, taken approximately one centimeter to the right of the middle of bearing 47. In this Figure, sensors 201 and 202 are shown, as is a sensor relative to the bearing 47. Rotational sensors of this type are well known in the art.

For certain embodiments of the robot, e.g. for the building structures having legs, the leg control is simplified by using two speed feed values in place of the servo valves 42. In this case, use will be made of power circuit 39 for direct control of the feed valves.

Shown in FIG. 3 is a shoulder hip structure which has the feature of three degrees of freedom afforded by a double-acting jacks 44 having a vertical axis and a double-acting jack 45 having a horizontal axis. In figure 2, a rigid frame 46 includes a cavity housing a ball bearing 47 (or a plain bearing or a conical or needle anti-friction bearing). Anti-friction bearing 47 affords a first degree of freedom, viz. freedom of rotation. A universal joint 48 affords second and third degrees of freedom. The anti-friction bearing 47 with the universal joint 48 is equivalent to a swivel joint; consequently, for small robots, a swivel joint may be used, which is more economical.

A plate 49 is fixed to the shoulder or hip shaft 50. A ball and socket joint 150 connects plate 49 and a jack piston rod. The corresponding jack body will be linked by a ball and socket joint 151 to a frame 46.

It should be appreciated that either two double-acting jacks or four jackes may be provided to increase the power of the robot.

It will be noted that a bellows 53 of flexible material is arranged to prevent the ingress of dust land water. Shoulder or hip motion may be supplemented with a translatory or rotational motion such as provided by a double acting jack 51.

It will be appreciated that the jacks may be either hydraulic or electrical; in FIG. 3 the kinetics is apparent.

If the above described control system actuates only jack 44, shoulder or hip shaft moves upward, with a small parasitic component caused by the fixed point of jack 45. But this component is minor and can be compensated for by cooperative, very small amplitude action of jack 45. Should only jack 45 be actuated, jacks 44 and 45 being at right angles, the action is offset 90°, i.e. the movement produced is a rearward motion. If both jacks are jointly actuated, then a rotary motion of the shoulder or hip will be produced.

In the case where hydraulic jacks are used, it will be advisable to secure the jack body on the shoulder or hip shaft side and the piston rod on the frame side so as to use the larger force for upward displacement of the robot, instead of the contrary. One of the advantages of the system lies in the combination of movements in the slow speed locomotion mode, the leg being advanced without power for lifting it, and vice versa.

Leg induced locomotion requires energy savings per unit of distance covered.

Figure 4:
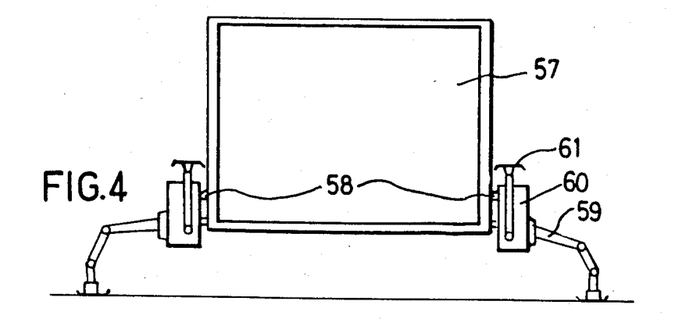
FIG. 4 shows an end elevational view of a pair of robots transporting a load.
Figure 5:
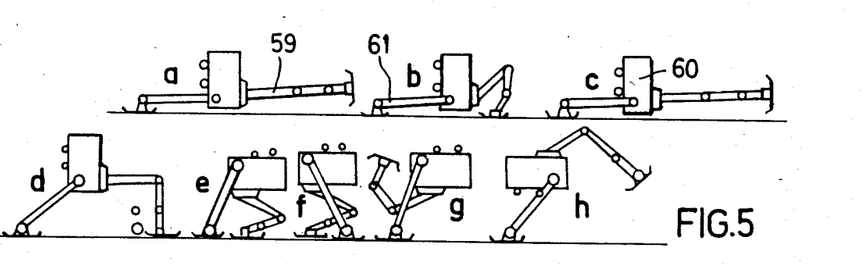
FIG. 5a, 5b, 5c, 5d, 5e, 5f, 5g and 5h illustrate, on a reduced scale, two types of locomotion for the robot shown in FIG. 4.

FIG. 4 shows a vehicle or mobile unit 57 which may be a truck, a small prefabricated building or a container clamped by clamping means 58 and lifted by self-contained legs 59 which are attached to their power units 60.

The auxiliary legs 61 are in their raised position. In this embodiment of the robot system, there are three main functions: approach, clamping and normal travel. Such functions are afforded by the power units 60 comprising: a power supply and a generator for supplying power to the legs (either electric power by batteries or fuel cells, or hydraulic power though an electric motor or heat engine). The power unit 60 also includes a control device, and telecommunications channel 11 (see FIG. 1) of the optoelectronic cell type is at the end of the clamping means 58.

Figures 6, 7, 8, 9:
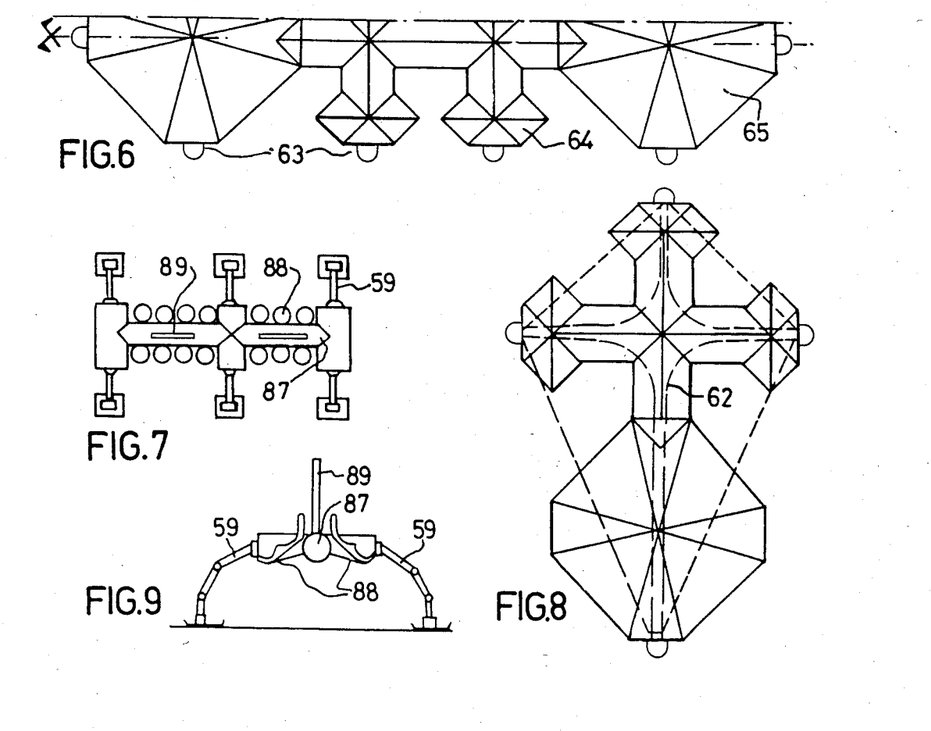
FIG. 6 is a top plan view of modular housing which can be transported by pairs of robots according to the invention.
FIG. 7 is a top plan view of a six-legged robot for riding around a park or displaying goods.
FIG. 8 shows a top plan view of a modular dwelling.
FIG. 9 shows a sectional view of the six-legged robot of FIG. 7.

Shown in FIG. 8 are the paths 62 of optical fibers for data transfer from one leg to another. The two auxiliary legs 61 on each power unit 60 are provided for approach travel. Such approach travel may occur in several different manners including the low stretch gait shown at a, b and c in FIG. 5, while the swing-out gait is shown at d, e, f, g, h in FIG. 5. Notice will be taken of the significant maneuverability afforded this configuration by the two auxiliary legs 61 which are not limited by abutments in their rotation about their axes. These axiliary legs moreover permit the robot to extricate itself by its own resources when it is in an overturned position. The mode of operation is as follows: the overturned, bogged unit must have robot clamping means. A signal with a specific coding is emitted from each of these clamping means either by ultrasonic or by electromagnetic waves.

The robots will be provided with positioning means responsive to this original transmitter 10 (FIG. 1). Since such devices are known, they need not be further described. The various robots are assigned to a clamping target in priority order according to a scheme stored in the memory 2 (FIG. 1). Inter-robot communication is effected through the telecommunications channel 11 (FIG. 1) by electromagnetic or ultrasonic waves.

When the robot reaches its target, it is clamped on the immobilized unit while still using the positioning means. In one embodiment, the clamping may be effected by the locking means for changing accessories or tools shown in FIG. 14.

Further embodiments with hooks or jacks are possible. Upon clamping, the robot brings its auxiliary legs to their raised position and tests the ground by measuring the ground bearing capacity, by means of articulatory variable sensors and strain sensors. Communication with the other clamped robots is afforded by optical fibers 62 (FIG. 8). Optical fibers 62 are sheathed and secured to the immobilized unit to be raised.

It is to be noted that the above described procedure may be applied to submerged vehicles or units. Then, as a function of the ground bearing capacity, one type of gait is selected. It will be remembered that, for a n-legged robot, the theoretical number of gaits is $(2_{n-1})$. But, among those gaits, are one leg at a time displacements, while other require use of half of the legs. It is important, with respect to a given ground bearing capacity, e.g. 200 kPa not be exceeded by the pressure exerted in normal travel when the unit weight only bears on three legs instead of six. For a 15 metric ton bogged truck, for instance, provided with eight clamping means with 350 mm×350 mm leg plates, a ground bearing capacity of 2 kPa, each leg can lift 2400 daN (deca Newton) per seven legs at slow speed, or a total of 16.8 metric tons, this being just sufficient, taking into account the dynamic coefficient, to extricate the truck. However, on firmer ground, a gait with alternate bearing on four legs then another four legs will permit advance at a higher speed.

FIG. 6 shows a half top plan view of a mobile dwelling having clamping plates which have legs installed thereon. These novel possibilities act to free the conventional architecture from the constraints of road and supply systems, but do not fall into traditional or mobile home categories, since such mobile dwellings are well over the maximum permissible size for road traffic. Moreover, they are able to move by means of legs, thus forming a large-sized robot for terrain unfit for conventional vehicles or mobile units.

Then, there are modular building structurer with living rooms 65 and small areas 64 for a kitchen, bathroom, etc.

For such building structures with legs, it is advisable not to use X legs with integrated control units and the auxiliary legs, but legs adapted to be secured on plates during transport, and which are supplied with power and coordinated by means installed for the purpose within the structure. It will be appreciated that the legs and control and power supply means may be successively used for changing the location of a plurality of building structures.

Figures 24, 25:
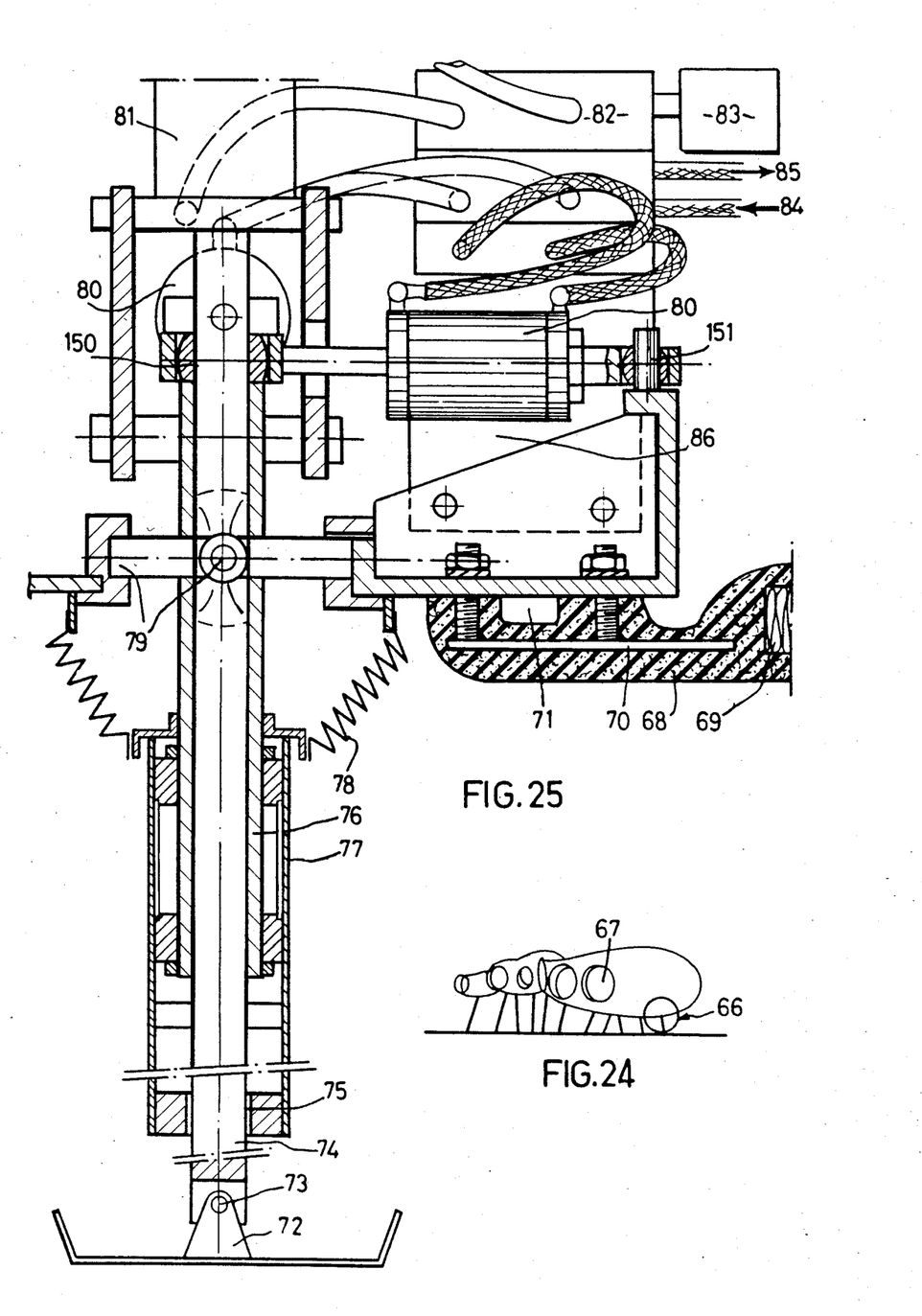
FIG. 24 shows an elevational view of building structure having legs to which other modules may be added.
FIG. 25 shows an enlarged sectional view of a robot leg for the building structure of FIG. 24.

A further embodiment of the present invention, also within the field of building structures with legs, is shown in FIG. 24. A plurality of units having port holes 67 are equipped with legs 66 as shown in detail in FIG. 25. The unit shell 68 may be a sandwich structure having a balsa core 69 with an internal and an external fiber glass-reinforced polyester skin.

A plate 70 embedded in polyester joins the shell 68 to the leg casing; and a seal 71 is provided therebetween. The leg comprises a groundplate 72 hinged at 73; the lower portion 74 of the leg slides in a ring 75 and a main tube 76. The tube 77 is merely a covering having no other function than that of preventing ingress of dust into the mechanisms. A flexible plastic bellows 78 provides further sealing. A universal joint 79 affords two degrees of freedom. Thereabove, two hydraulic jacks 80 arranged at right angles to each other allow planar movements of the leg; a third jack 81 provides a third degree of freedom required for a good distribution of the weight on the legs.

An assembly of hydraulic supply means 82 and a hydraulic fluid source 83 supply the jacks through inlet 84 with a fluid return through outlet 85. The assembly is mounted on a plate 86 adapted to be disassembled when not in use. Alternatively, jack 81, may be located within tube 77 but, in this case, it can not be rapidly dissasembled for rental for travel between locations.

FIG. 7 is a top plan view of another embodiment according to the present invention. A tubular structure 87 acts as a support for passanger seats 88 for visiting parks, exhibitions and the like.

Display units or advertizing panels 89 may be secured to the structure. Their purpose is to inform visitors of certain events inside the exhibition. The power supply comprises a set of batteries housed in the structure, which may be easily removed from beneath the robot.

The kinematics of the robot permits it to remove and replace batteries by lowering itself to the ground, by means of a locking device for handling the batteries. The batteries power a hydraulic pump which supplies pressure to each leg 59. In the case quick recharging is required, high pressure compressed air tanks may be used to supply an air-oil exchanger.

Figure 10:
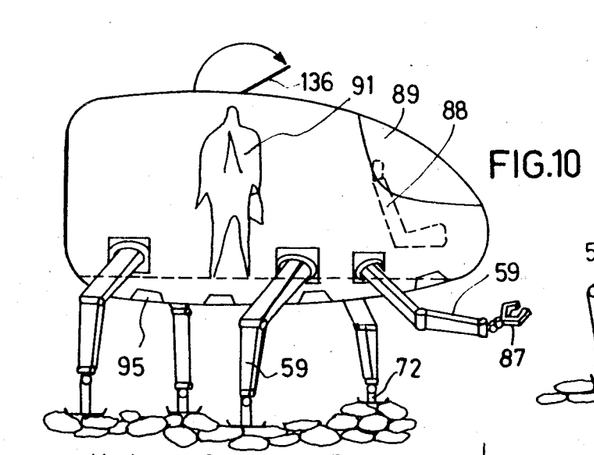
FIG. 10 shows a side elevational view of a recreational robot having living quarters.

FIG. 10 shows an elevational view of another embodiment according to this invention, viz the recreational robot having legs 59. Mounted on the four rear legs are support plates 72 permitting travel on the ground; the two front legs or arms have working claws 87.

Figure 11:
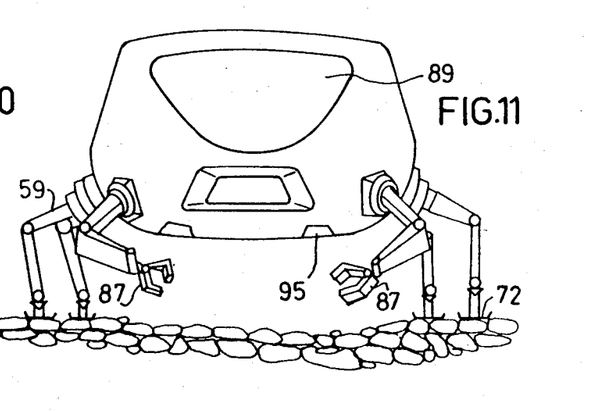
FIG. 11 shows a front elevational view of the recreational robot of FIG. 10.

FIG. 11 shows a front elevational view of the same robot. A window 89 for the control cab is provided.

Figures 12, 13:
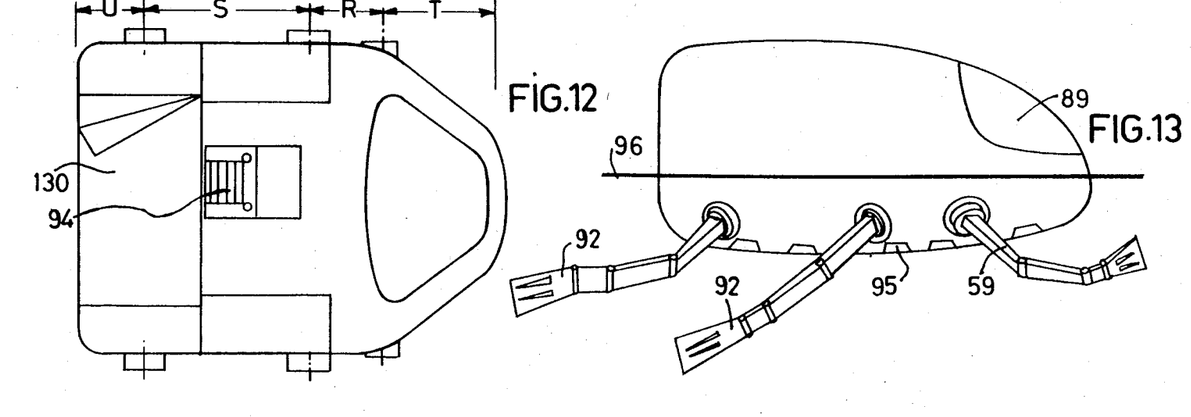
FIG. 12 shows a top plan view, illustrating the amenities of the robot of FIGS. 10 and 11.
FIG. 13 shows a side elevational view of the recreational robot of FIGS. 10–12 with accessories for swimming.

FIG. 12 shows a top plan view of one type of arrangement of the recreational robot with a sleeping compartment 130, stairs 94 for access to the exterior and lighting panel 136. Under the stairs, a power unit 129 is housed to ensure correct equilibrium of the robot during travel employing six legs, or during use of the robots claws.

To enhance the stability of the robot and the ability thereof to handle heavy loads, care should be had to comply with the following relation:

$$1 R < S < 2R,$$

R being the space between the front legs and the middle legs, and S being the space between the rear legs and the middle legs. Preferably, the space T between the front legs and the front end of the robot, and the space S between the rear legs and the rear end of the robot are so chosen that the centre of gravity of the robot with the legs in the rest position is spaced from the middle legs by at most $\frac{1}{3}$ of R or S.

For optimum balancing of the robot, front and rear ballast tanks are used to improve the equilibrium when a passenger 91 is moving around inside the robot or during handling of a heavy load by the claws. In FIG. 13 it will be noticed the legs 59 are equipped with flippers for swimming and the water-line mark 96.

One of the features of the invention lies in the device for permitting the robot to make an accessory tool change. Storage compartments 95 are provided inside the robot's shell for various accessories or tools which the robot can grasp, lock and use for carrying out various operations.

Figure 14:
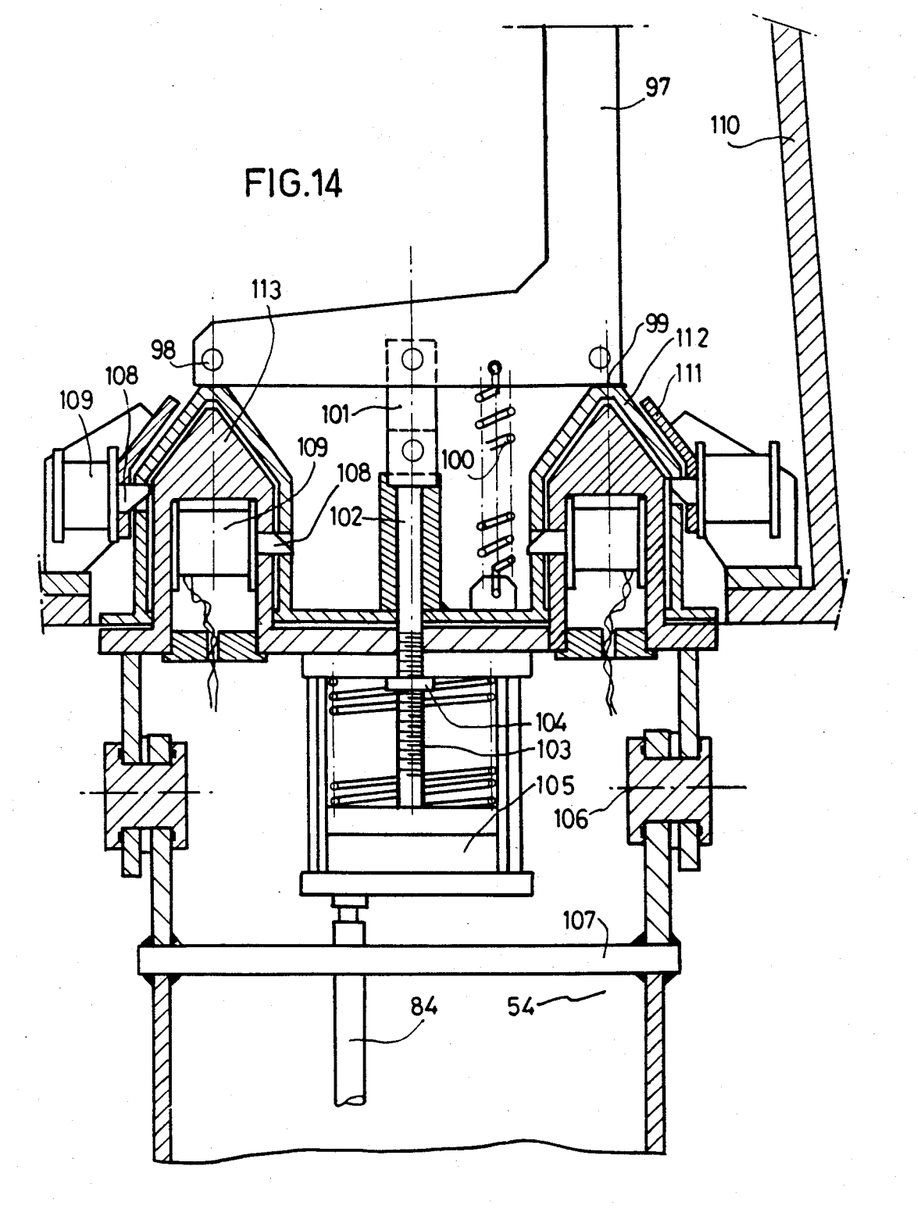
FIG. 14 shows a sectional view of an automatic tool or accessory changing device.

FIG. 14 shows one such embodiment wherein pliers 97 are pivotally mounted on pivot pin 98 with a conical member 99 acting as an abutment; a return spring 100 keeps the pliers in the open position. A connecting rod 101 transmits force from plunger 102 to close the pliers. Plunger 102 is mechanically connected to piston rod 103 of a hydraulic jack. The piston rod 103 has a Grey code (binary reflected code) which is read by the optoelectronic cell 104 so as to supply a signal indicating the position of piston rod 103. A distributor valve connected to the robot system supplies, via hose 84, a chamber 105 of the single acting jack. Rotation about axis 106, between the pliers and the robot leg 54 is controlled by a jack on leg 54.

Alternatively, to increase the number of degrees of freedom of the robot's wrist, there is secured on plate 107 rotatable means along the longitudinal axis of the leg and/or a second tilting means about axis 106.

For the wrist motion, a shoulder structure line device, reduced to wrist size, provide three degrees of freedom. The dynamic possibilities are improved if the jacks for wrist motion control, via ball linkages or cables, are mounted in the robot's shoulder.

The FIG. 14 arrangement has two similar functions the interchangeability of the tools and the tool support which serves as a rack for partitioned compartments 110 affording fluid tightness of the tool carrying door in the shell. In each of these functions, there are again: the approach, locking, control and in addition, for tool or accessory changing, the power transmission. Travel approach is effected through friction members 111 and 112 for tool or accessory assembly in the storage compartment. For the wrist-to-tool or accessory approach, surfaces 113 and 112 ensure the function. As a matter of fact, it would be prejudicial for the robot system to have a positioning precision of the order of one millimeter at the end of the wrist. It is more appropriate to work with lesser precision, of the order of one centimeter, while providing friction surfaces which guide the approach of the wrist towards the tool or accessory or the tool or accessory into the storage compartment.

The guiding action is supplemented by software which monitors the increase of resisting forces in the approach phase and effects correction by control of the opposed actuator. This, in fact, involves an additional servo-loop which is enabled only during the approach phases.

Locking is effected by a lock 108 actuated by a solenoid 109. Connecting rods, racks and eccentrics may remplace this simple solenoid device for special applications. In any event locking will be checked by electric contact between the locks, optoelectronic or capacitive sensors. Such devices are devices known in the art. The tool accessory changing means of the robot system according to the present invention is applicable especially for the following elements:

flippers for swimming made of reinforced plastics with a metal plate for securement to the wrist;

cutting tools comprising a blade and an attachment plate for farm work;

public works tools such as pneumatic hammer, cable shears and sprayers pencil-shaped legs of solid steel in sensitive to the explosion of mines; and propeller propulsion units and hydrodynamic carrier planes having an angle of incidence controlled by the position of a leg and/or a wrist actuator.

Another component of the present robot system is the so-called collar or neck. This affords pivotal connection between the robot's body and head.

Figures 20, 21:
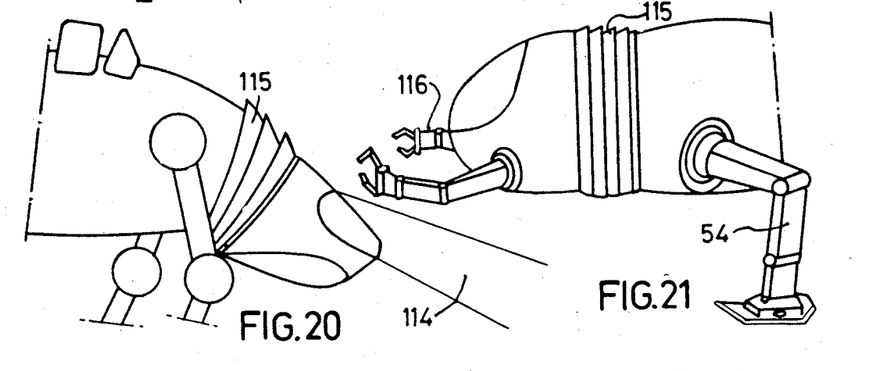
FIG. 20 shows a partial side elevational view of a recreational robot having front legs and a tilting head for ground locomotion.
FIG. 21 shows a partial side elevational view of another recreational robot having a stationary head and front arms mounted on the head.

FIG. 20 shows the front portion of a robot having its head titled for walking or ground locomotion. The field of vision of the control cab 114 is necessary for easy displacement in the manual mode. In the marine navigation mode, since on the contrary a low-drag hydrodynamic profile has to be provided, the raised position is required.

FIG. 21 shows the front portion of a robot having its collar 115 in a horizontal position, with mandible arms attached to the head 116. The collar 115 provides the advantage of a particular kinematics of the mandibles with respect to the robot's body.

Figure 18:
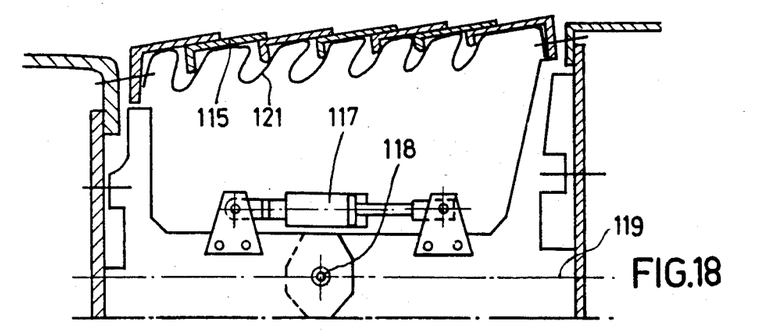
FIG. 18 shows a horizontal section of an articulated neck or collar or another recreational robot.

A first embodiment of the collar 115 is shown in FIG. 18, this horizontal sectional view illustrates the mounting of a jack 117 between the head and body through a central pivot 118. The mounting is symmetrical with respect to the robot's longitudinal axis 119. An absolute or analog incremental displacement sensor is secured between the head and body; the signals are directed to an interface circuit connected to input-output circuit 27. Serially connecting two mechanisms, one horizontal and the other vertical, will provide the downward, upward, rightward, and leftward movement of the head.

Overlapping elements 115 form the rigid part of collar. A neoprene seal 121 forms the flexible part of the collar.

Figure 19:
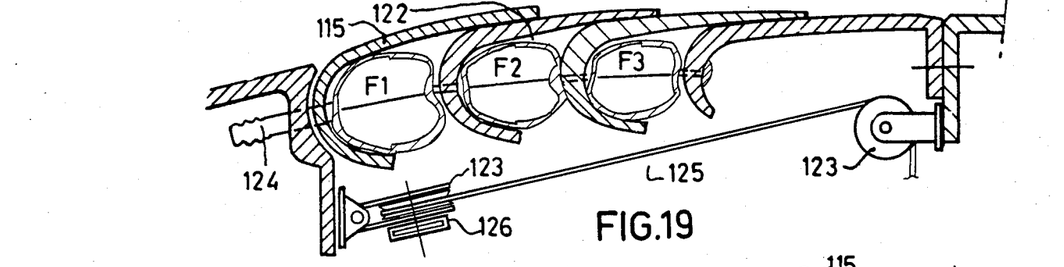
FIG. 19 shows a horizontal section of an alternative embodiment of an articulated neck or collar of another recreational robot.

A second embodiment of the collar is shown in FIG. 19. The overlapping elements 115 include pneumatic or hydraulic bladders 122. The bladders 122 are interconnected by ducts for fluid transfer between each other. On one of the ducts per side to be controlled of the four ducts in the case of rightward, leftward, upward, and downward control, a connection fitting 124 is attached. Fluid is supplies to the collar through fitting 124. In this embodiment involving rightward, leftward, upward, and downward control, there will be for each overlapping element four bladders 122 each developing a force F1, F2, F3 which corresponds to the fluid pressure. A cable system 125 with pulleys 123 maintaining the average spacing between the robot's head and body. The cable interconnects four pulleys fast with the head and four pulleys secured to the body. Moreover, four incremental rotation sensors 126 are connected through an interface to the microprocessor 25 (FIG. 1) this allowing determination of the robot's head with respect to the robot's body.

The bladders 122 include a thick portion not covered by the associated overlapping element 115. The thick portion of the bladder is unstretchable. Thereby, preventing bulges. The reduced size collar arrangements may be used for robot trunks or proboscises.

Figure 15:
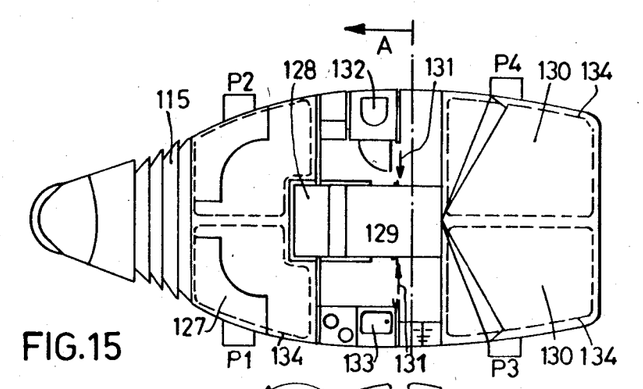
FIG. 15 shows a cutaway top plan view of another embodiment of leasure robot as viewed from above.

FIG. 15 shows an interior plan view of a recreational robot having a control cab, a collar 115, a livingroom area 127 with seating, an exit air lock 128, a control and service compartment 129, comprising an engine, and hydraulic and service equipment, two rear cabins 130 with doors 131, a bathroom 132, a kitchenette 133. Ballast containers 134 of elastomeric material for submersion of the robot are shown in dotted lines.

When the ballast containers 134 are not in use they are folded up at the bottom of chests therefor or, in the case of the collar 115, against the vertical walls. When the dive signal is given, the pumps and the ballast valves 30 are energized by circuit 27 (FIG. 1). Trim is controlled by the inclinometer 28 (FIG. 1). This type of submersible robot may dive only a few meters below the surface.

In each ballast container (except the one for collar ballast) is welded an internal partition which accomodates ballast for equilibrium of the robot. This is necessary because, during slow speed travel the position of the center of gravity of a four legged robot is near the limits of the buoyancy triangle when a leg is lifted.

Passengers of the recreational robot may move about inside the same without being concerned with the equilibrium of the robot which is ensured by flow of water between the different ballast containers under the action of pumps and ballast valves which are controlled by valve 30 of the data processing unit connected to the force sensor 37.

Figure 16:
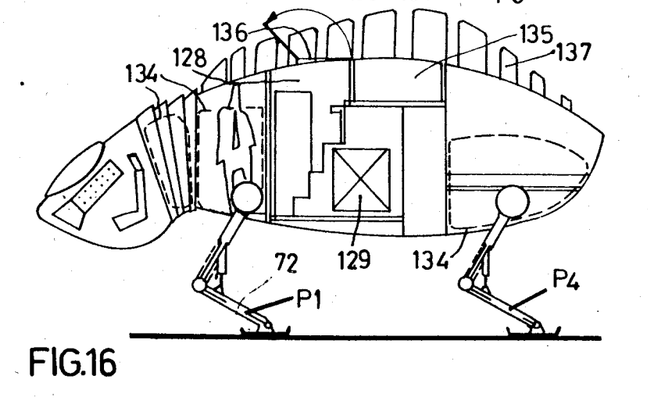
FIG. 16 shows the same robot in elevational view.
Figure 17:
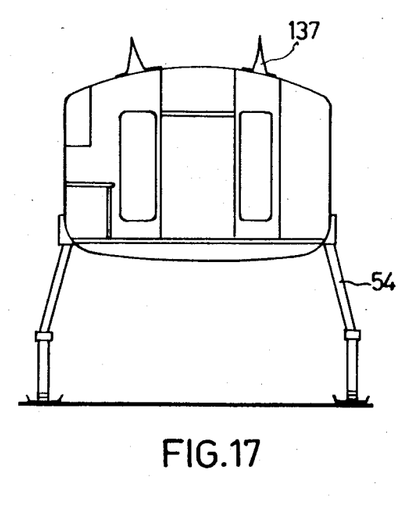
FIG. 17 shows the same robot in cross-section.

FIG. 16 shows the ballast containers 134 in elevational. The exit hatch 136 and the central cab 135 are also seen therein. Dorsal fins 137 may serve as a backrest or guardrail for sun bathers lying on the back of the robot. The dorsal fins 137 are made of molded resin and are fixed to the shell by screws threaded into inserts.

Legs 54 (FIG. 7) are an alternative embodiment of the arrangement shown in dotted lines in FIG. 2. Shoulder/hip structure is fixed to the leg 54. It will be observed that with such a leg the rotational torque is very large especially during reciprocating decelerations. Two additional jacks 44,45 are preferably employed acting in opposite directions.

It will be noted that, in the case of legs according to FIG. 16, the displacement of the shoulder/hip joints is about 90° since the front back or up/down displacements are small. In this event it may be preferable to maintain the dimension R unchanged and increase the dimension S to augment the effective torque.

To obtain rotation through more than 90° about the axis of a shoulder/hip joint it will be necessary to place the lever 49 on the other side of the axis joining ball-and-socket joints 150 and 151 for the jack 44 in FIG. 2.

From the great number of theoretically possible gaits for a four-legged robot, only a few may be used owing to the real time calculation requirements for dynamic control.

The system of this invention allows transition from a slow gait, without dynamic control, to a faster gait. In fact, the microprocessors of central processor 1 and 32 (FIG. 1) may be replaced by pairs of APX432 type microprocessors (Intel Corporation, 3065 Bowers Avenue, Santa Clara, Calif. 95051) and, as the robot learning progresses, the calculation capacity thereof may be increased by cascade connection of a plurality of microprocessors for the central processor 1.

The simplest gaiting mode of a four-legged robot consists in raising only one leg at a time. For example, reference will be had to FIG. 15 where the legs are numbered P1, P2, P3 and P4, and the movements of the legs P1–P4 will now be described for such a one leg at a time gaiting mode.

Step one, all the legs are in contact with the ground legs P1 and P3 ahead of legs P2 and P4, legs P1 and P4 defining a parallelogram, with leg P1 being the forwardmost leg. Step two, leg P4 is raised and moves toward leg P2. Step three, leg P4 is placed behind leg P2, all the legs P1–P4 being on the ground. Step four, leg P2 is raised and moves forward. Step five, leg P2 bears on the ground and the legs P1–P4 form a parallelogram which is the opposite of the parallelogram formed at step one, since leg P2 is now the forwardmost leg. The foregoing procedure is continued.

Figure 22:
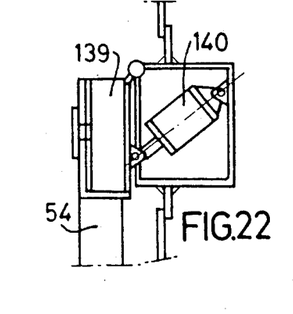
FIG. 22 shows a cross-sectional view of another embodiment of a robot's shoulder/hip structure.

FIG. 22 shows an embodiment of a shoulder or hip structure for an auxiliary leg with a radial piston hydraulic motor 139 and a spacing jack 140.

Figure 23:
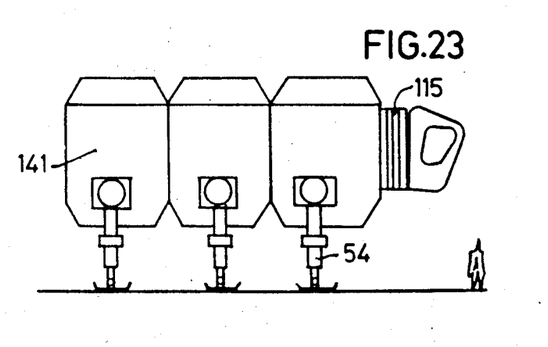
FIG. 23 shows a side elevational view of a modular robot.

FIG. 23 shows an assembly of robot modules 141 with a collar 115 for a front cab. In a robot assembly of this type, the number of modules may be increased to about six to 12, this being a further embodiment of the legged modular robot.

An advantage of the invention results from the fact that the legs or arms pivot about three axes about a fixed point, and the articulation may comprise, as shown in FIG. 2 a universal joint 48 supported by a bearing 47 that is to say, in all, three bearings or pivots having mutually perpendicular axes and passing through the associates point.

Figure 26:
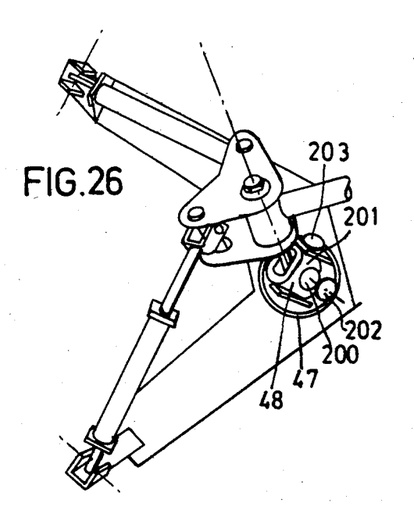
FIG. 26 shows diagrammatic perspective view of a robot shoulder/hip structure.

According to an important feature of the invention, shown in FIG. 26, at least one of the bearings or pivots 47, 200, 201 and preferably all of them, is provided, with a rotation sensor 202, 203, the rotation sensor for bearing 47 not being shown in the drawing. Thus, an extremely compact structure is obtained for sensing the position and orientation of a leg or arm.

Figure 27:
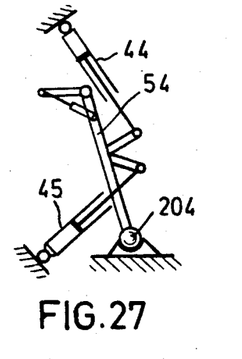
FIG. 27 shows a diagrammatic perspective view of another shoulder/hip structure.

FIG. 27 shows a shoulder/hip structure which differs from FIG. 2 since the fixed point, represented here by a ball-and-socket joint 204, is placed at the end of a leg 54 and the jacks 44,45 are at an intermediate position along the leg. Such a structure is interesting for a robot whose interior space is small, because the jacks may be disposed outside.

Figure 28:
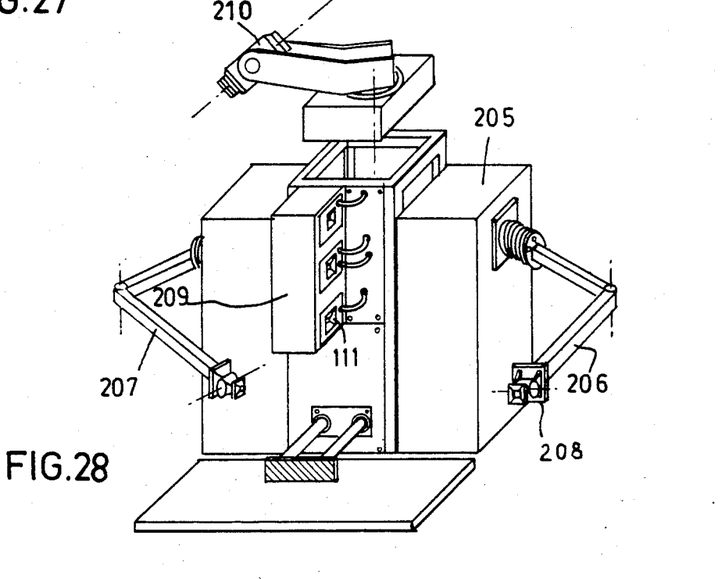
FIG. 28 shows a perspective view of a robot having arms, for use with a machine tool.

FIG. 28 relates to an application of the invention to robot having arms, intended for instance, for feeding a machine tool. The robot comprise a frame 205 which supports two arms 206–207 having pivoted shoulders as above described. Arms 206–207 are terminated by a wrist 208 which is constructed as shown in FIG. 14, and they are able to take tools out of a tool chest or compartment 209 (the tool chest for leg 207 not being shown). Obviously there may be more than the three tool chest doors 111 shown in 28. It may be also interesting to provide the tool chest in the vicinity of a shoulder.

The arms 206,207 are designed to cooperate together, that is, to carry out different movements of a workpiece to be machined, by a coordinated action of their jacks. Numeral 210 designates a guidance camera which is connected to the shape recognition circuits 6 mentioned above.

The present invention provides a novel recreational robots, four or eight legged survival robots, building structures with legs for motels, vacation centers, big mobile units for public or private works, agricultural vehicles, public works vehicles, snowmobiles and automatized plants.

What is claimed is:

1. A robot system comprising a robot having a plurality of articulated members, actuating means for effecting movements of said articulated members, and a data processing unit for controlling said actuating means, one of said articulated members being pivotally mounted about three separate axes intersecting at a first fixed point, said actuating means for said one articulated member comprising two jack actuators, two ball joint means for articulating said jack actuators to said one articulated member about two points separate from and out of alignment with said first fixed point, and two other ball joint means for articulating said two jack actuators about respective second and third fixed points separate from and out of alignment with said first fixed point.

2. The robot system of claim 1, wherein said data processing unit comprises a central microprocessor, manual control means for selectively actuating said central microprocessor and substituting another microprocessor therefor, and a keyboard control for controlling said other microprocessor.

3. The robot system of claim 1 especially intended for moving a body such as a truck, a prefabricated building or a container, wherein said robot is a self-contained module including a power unit, two said articulated members being provided on said power unit, said power unit comprising clamping means for clamping said module on said body, a control device and a telecommunications channel for connection with said data processing unit, said channel being at the end of said clamping means.

4. The robot system of claim 1, especially intended for moving a body such as a truck, a prefabricated building or a container, wherein said robot is a self-contained module including a power unit, said power unit comprising a drive articulated member provided on said power unit, clamping means for clamping said module on said body, a control device and a communications channel for connection with the data processing unit, said channel being at the end of said clamping means.

5. The robot system of claim 1, said robot comprising a plurality of legs consisting of said articulated members, a tubular body, wherein seating is provided on said tubular body.

6. The robot system of claim 1, said robot comprising a plurality of legs consisting of said articulated members, a tubular body, wherein display means are provided on said tubular body.

7. The robot system of claim 1 specially intended for moving a modular building structure including modular housing units, the modular housing units being of the type having lateral and front plates adapted to be clamped by said articulated members for displacements between locations, wherein said robot further comprises means for clamping said articulated members on the clamping plates.

8. The robot system of claim 1, wherein said robot comprises a head, a body and a collar therebetween, said collar comprising rigid overlapping elements, sealing means provided between said overlapping elements, and a jack actuator for controlling the position of said head relative to said body.

9. The robot system of claim 1, wherein said articulated members form legs of the robot for recreational purposes and wherein said robot comprises a head, a body and a collar therebetween, mandible articulated members being mounted on said head.

10. The robot system of claim 1, further comprising dorsal fins mounted on the back of said robot defining a backrest and a guardrail.

11. The robot system of claim 1, wherein said robot comprises a plurality of legs consisting of articulated members, a central cabin, at least one rear cabin and a power unit under said central cabin.

12. The robot system of claim 1, wherein said articulated members function as legs for motion of the robot on a ground and wherein said robot comprises ballast containers for selectively controlling diving and equilibrium of said robot.

13. The robot system of claim 1, wherein said robot comprises a shell including a tool/accessory chest therein, tool/accessory changing means at the free ends of said articulated members including friction surfaces, and a servo loop for controlling the operation of said tool/accessory changing means.

14. The robot system of claim 1, wherein said articulated members comprise a bearing in which a universal joint is mounted comprising other bearings, said bearing being equipped with rotation sensors.

15. The robot system of claim 1, wherein said first fixed point is disposed between said jack actuator means and a free end of said one articulated member.

16. The robot system of claim 1, wherein said one of said articulated members is mounted by a universal joint and said first fixed point is the center of said joint and wherein said joint is disposed between said jack actuator means and a free end of said one articulated member.

17. The robot system of claim 1, wherein two said articulated members are provided, means for coordinating movements of said two articulated members for holding articles, and a tool/accessory equipping one of said articulated members.

18. A robot system comprising a robot having a plurality of articulated members, actuating means for effecting movement of said articulated members, and a data processing unit for controlling said actuating means, one of said articulated members being pivotally mounted about three separate axis intersecting at a first fixed point, said actuating means for said one articulated member comprising two jack actuators, two ball joint means for articulating said jack actuators to said one articulated member about two points separate from and out of alignment with said first fixed point, and two other ball joint means for articulating said two jack actuators about respective second and third fixed points separate from and out of alignment with said first fixed point, wherein said one articulated member comprises a plate perpendicular to its longitudinal axis, said second and third points at which said two ball joint means are articulated to said two jack actuators being disposed at said plate, the axes of said two jack actuators lying in mutually perpendicular planes.

19. A robot system comprising a robot having a plurality of articulated members, actuating means for effecting movements of said articulated members and a data processing unit for controlling said actuating means, one of said articulated members being pivotally mounted about three separate axes intersecting at a first fixed point, said actuating means for said one articulated member comprising two jack actuators, two ball joint means for articulating said jack actuators to said one articulated member about two points separate from and out of alignment with said first fixed point and two other ball joint means for articulating said two jack actuators about respective second and third points separate from and out of alignment with said first fixed point, said robot further comprising a head, a body and a collar therebetween, the collar comprising rigid overlapping elements, fluid controlled bladders between said overlapping elements for exerting variable pressure thereon and pulley and cable means for maintaining the distance between said head and said body.

* * * * *